June 11, 1940.    J. F. SMITH    2,204,386
PRESSING MACHINE FOR USE IN FOOTWEAR MANUFACTURE
Filed Oct. 28, 1938    6 Sheets-Sheet 1

June 11, 1940.  J. F. SMITH  2,204,386

PRESSING MACHINE FOR USE IN FOOTWEAR MANUFACTURE

Filed Oct. 28, 1938  6 Sheets-Sheet 3

INVENTOR
John F. Smith
BY
Melvin I. Herold
ATTORNEY

June 11, 1940. J. F. SMITH 2,204,386
PRESSING MACHINE FOR USE IN FOOTWEAR MANUFACTURE
Filed Oct. 28, 1938 6 Sheets-Sheet 5

Fig. 8.

INVENTOR
John F. Smith
BY Melvin J Herold
ATTORNEY

June 11, 1940.   J. F. SMITH   2,204,386
PRESSING MACHINE FOR USE IN FOOTWEAR MANUFACTURE
Filed Oct. 28, 1938   6 Sheets-Sheet 6

Patented June 11, 1940

2,204,386

UNITED STATES PATENT OFFICE 2,204,386

PRESSING MACHINE FOR USE IN FOOTWEAR MANUFACTURE

John Frederick Smith, Quincy, Mass., assignor to Compo Shoe Machinery Corporation, Boston, Mass., a corporation of Delaware Application October 28, 1938, Serial No. 237,447

42 Claims. (Cl. 12—37)

This invention relates to pressing machines, and especially to such machines having utility in the manufacture of footwear. More particularly, it contemplates provision of machines useful in shoe bottoming and other operations such as sole conforming or shank molding in which the soles of completely assembled shoes are pressed and shaped to the last bottom, sole laying temporarily cemented soles prior to stitching, channel laying, sole attaching permanently cemented outsoles, molding insoles to a last bottom prior to lasting the upper, molding outsoles before their assembly with a shoe, and in short, useful in any such operation where shoe parts are to be subjected to pressure.

A general object of the invention is to provide a pressing machine having a plurality of fluid operated presses mounted for movement in a closed continuous path, and equipped with improved fluid controlling and distributing means giving very rapid and efficient performance, so as to make this type of apparatus efficiently available for many different shoe part treating operations.

Particular objects of the invention are to provide pressing machines having a carrier bearing a plurality of presses each having an associated fluid pressure operated device, in which pressure is applied to and exhausted from said devices with great rapidity so that there is no hindrance to production through having the operator pause for completion of these operations, and in which the operation is largely automatic while yet providing flexibility of control by the operator, particularly at the loading and pressing station.

Further particular objects of the invention are to provide a pressing machine equipped with a plurality of presses each having an associated fluid pressure operated device having a conduit leading to a central fluid pressure distributor in which each conduit is provided between the distributor and its pressure device with an improved valve construction capable of very rapid action, and to provide improved valve operating mechanisms and press driving means arranged collectively to afford speedy production coupled with flexible control.

Other objects of the invention are to provide a shoe pressing machine having a plurality of valve equipped presses and means for operating such valves in orderly sequence partly under the control of the operator and partly automatically, together with means for automatically compelling the operator controlled portion of the mechanism to partake of such orderly sequence to assure a consistent or non-interfering relation among the machine parts at all times.

Further objects of the invention are to provide a machine of this type which is capable of applying and maintaining proper pressure, is easy to control and operate, is sure and rapid in its prescribed actions, is comparatively simple in structure and unlikely to get out of order, and is of compact design requiring but little floor space.

Other objects of the invention will in part be obvious and will in part appear hereinafter.

The invention accordingly comprises the features of constructions, combination of elements, and arrangement of parts, which will be exemplified in the construction hereinafter set forth and the scope of the invention will be indicated in the claims.

In one illustrative embodiment of the invention herein particularly described, there is provided a rotor turning on a horizontal axis and having inflatable presses regularly disposed about its periphery. Air for inflating these presses is led to a central distributor on the rotor, from which individual conduits lead to the several presses. A sleeve valve is slidably placed in each conduit for movement between press inflating and deflating positions. An electric motor turns the rotor to bring each press intermittently to a top operating station where it is loaded and inflated. An electric inflating solenoid acts to move the valve of the press at the loading station to inflating position, in which the press is put in communication with the distributor. Another deflating solenoid controls a spring impelled pusher, which at a point in advance of the inflating station, acts to slide the adjacent press valve to cut off communication between the distributor and press and open the latter to atmosphere. The machine is wired so that the operator, after loading a shoe or other work in the press at the operating station during a dwell, first closes a switch operating the inflating solenoid and then closes a switch starting the motor to turn the rotor, these switches being operated from a common pedal control. A switch operated by the turning parts automatically cuts out the motor when the next press reaches the operating station. The deflating solenoid is connected across the motor line, so that the spring impelled pusher is held inoperative while the rotor turns, but acts to move a valve into deflating position during the dwell period, so that the press arriving at the inflating station is deflated and ready to unload, while the press in its travel between the inflating and deflating stations is constantly under pressure from the supply line, thus avoiding leakage losses.

In another and presently preferred form, the invention provides a generally similar rotor type of machine wherein the sleeve valve in each press conduit is of a three-way type, movable to inflating position where the press communicates with the distributor, to a mid-way cut-off position where the air in the press is locked in but does not communicate with the supply line, and to deflating position, where the distributor is cut-off from the press and the latter is opened to atmosphere. A foot treadle linkage is operable to move the valve of a press at the loading station to any desired position, so that the operator can, during a dwell, inflate and, in case readjustment of the work is wanted, deflate without moving the rotor. This linkage also acts to move the valve of another fully inflated press to midway cut-off position. Beyond this press and in advance of the loading station a solenoid controlled deflating pusher acts to move the valve of an adjacent press to deflating position, and is preferably so wired with respect to the driving motor as to effect this operation during the latter portion of the dwell period, thus maintaining clamping pressure for a maximum period, and also avoiding leaving the work completely ungripped in a press while the latter is around at the side of the rotor where the work might fall out if entirely released.

In each case the provision of a slide or sleeve valve enables the use of large ports so that there is no restriction in the air line in the valve area, and very quick inflation and deflation can be effected. These valves have the further advantage of being inherently balanced to stay wherever they are put without any holding or locking mechanism, so that once positioned, they continue inflation or deflation of their particular press until again positively moved.

For a fuller understanding of the nature and objects of the invention reference should be had to the following detailed description taken in connection with the accompanying drawings, in which.

Figure 1:
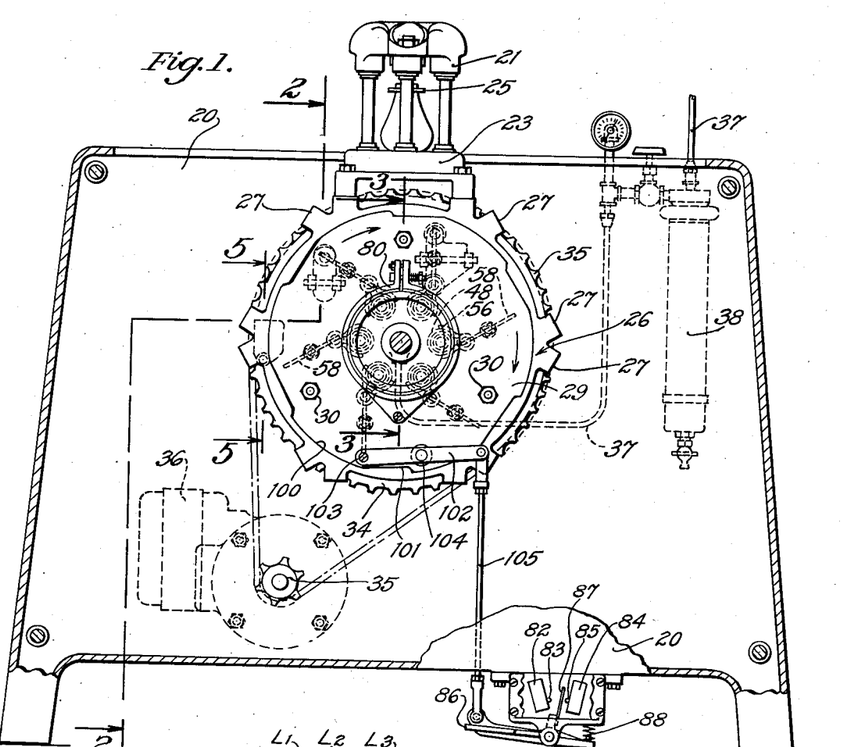
Fig. 1 is a front elevation of one form of machine embodying principles of invention with the major portion of the front frame plate and most of the presses removed better to illustrate the construction.

Referring more particularly to the drawings and first to the form of machine shown in Figs. 1 to 6, there is provided a frame 20 in the form of a shell like casing enclosing almost all of the moving machine parts, and open at its top to expose the uppermost of a plurality of presses 21, only one of which is shown in Fig. 1.

Figure 2:
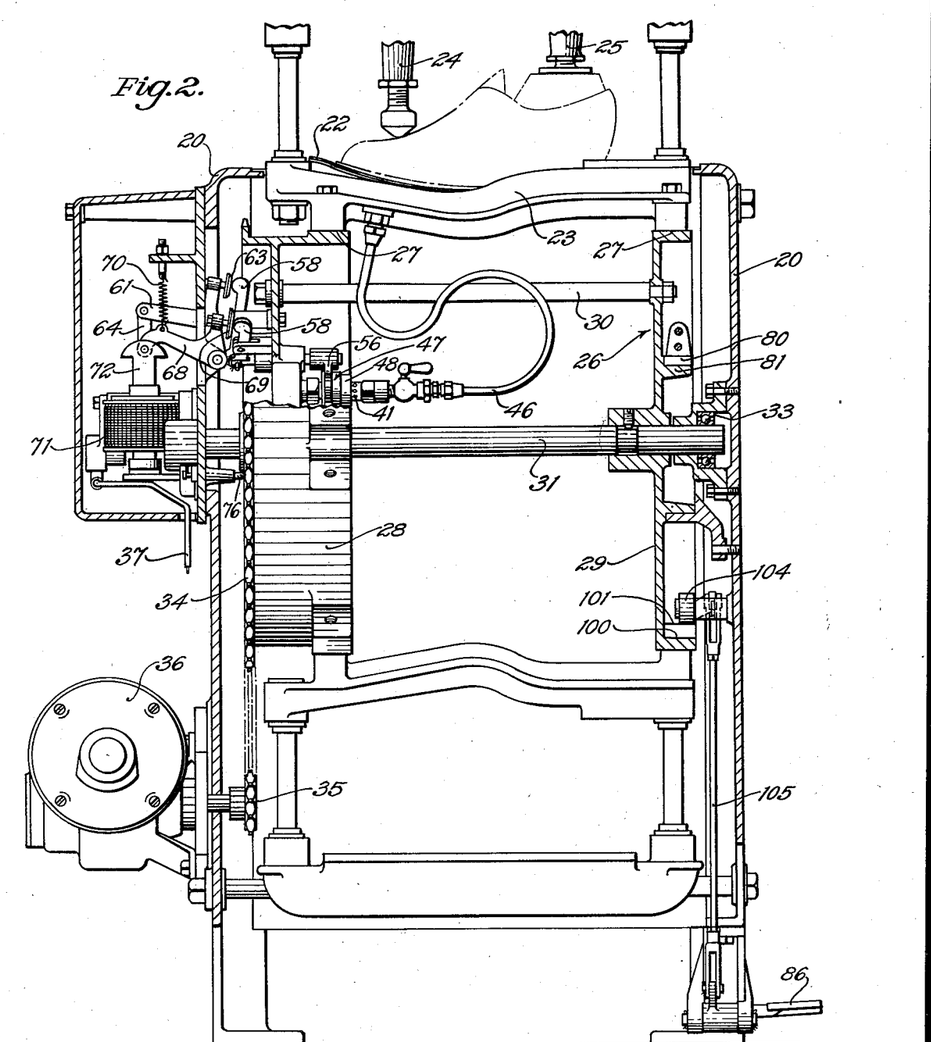
Fig. 2 is a transverse sectional view on an enlarged scale taken substantially along line 2—2 of Fig. 1.

The press 21 may be of any type or form suitable for carrying out any shoe part pressing operation, such as those mentioned above. Each press has associated with it a fluid operated pressure applying device, which in the present instance is illustrated as being an inflatable pad 22 (Fig. 2). This pressure applying device may be operated by either air or liquid and may assume any suitable form amenable to use of these mediums, such as the pad illustrated, a pressure applying piston (not shown) or the like. In the illustrated press the pad is carried in a base 23 and has shoe or last supports 24 and 25 held thereover.

Each of the plurality of presses employed is mounted for movement with a suitable carrier, illustrated as a generally circular rotor, designated 26, having a plurality of regularly spaced press accommodating seats 27 disposed about its periphery. Seats for six presses are shown, although this number may be varied within reasonable limits, depending on the work requirements and available space.

The rotor comprises a pair of opposed drum heads 28 and 29, best shown in Fig. 2, joined by spacing struts 30, and keyed to a horizontal shaft 31 journaled in roller bearings 32 (Fig. 3) and 33 (Fig. 2) on the frame.

Drum head 28 carries a driven sprocket 34, and is turned by a sprocket chain driven by a driving sprocket 35 connected through suitable gearing with an electric motor 36. The rotor is started and stopped by starting and stopping this motor through suitable switch controls hereinafter described.

Air or other suitable fluid under pressure is led from a compressor (not shown) through a supply pipe 37 (Figs. 2 and 3), in which a constant pressure regulating valve 38 is preferably inserted, to a cap 39 having an interior bore communicating with the supply pipe. The cap bore communicates with a bore 40 in the rotor shaft 31. Suitable packing between the cap and shaft is provided including a sleeve 41 fixed to the cap 39 and having a reduced shaft extension 42 rotatable therein. Washers 43 pack the space between the sleeve 41 and the shaft extension 42 and are urged into tight seating position by a spring, and also by fluid pressure which is led between them through suitable ports 44. The shaft bore 40 communicates with a central distributor 45 cast in the rotor drum head 28 and forming a common source of pressure fluid for the several presses.

Figure 3:
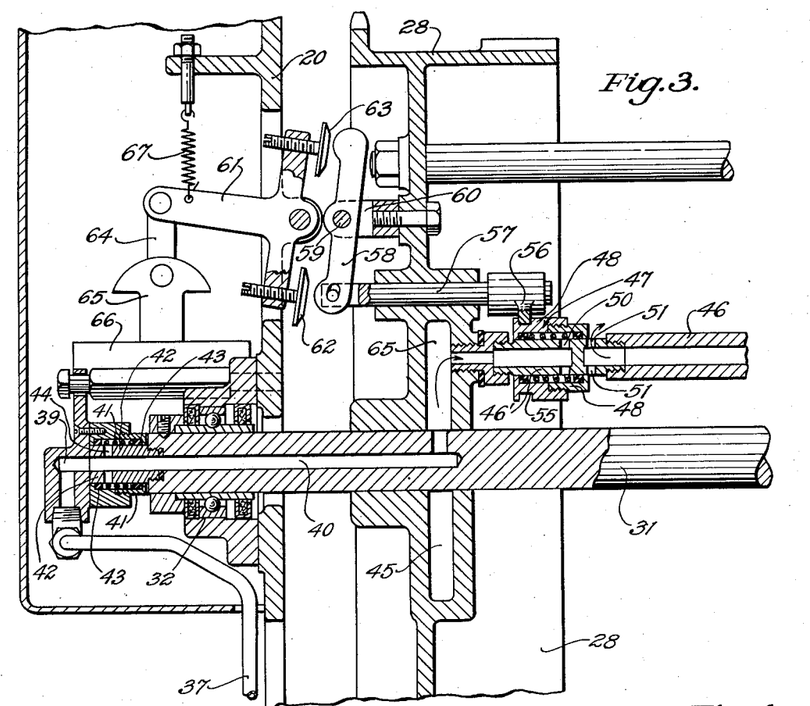
Fig. 3 is a fragmentary sectional view on a further enlarged scale taken along line 3—3 of Fig. 1.
Figures 4, 5:
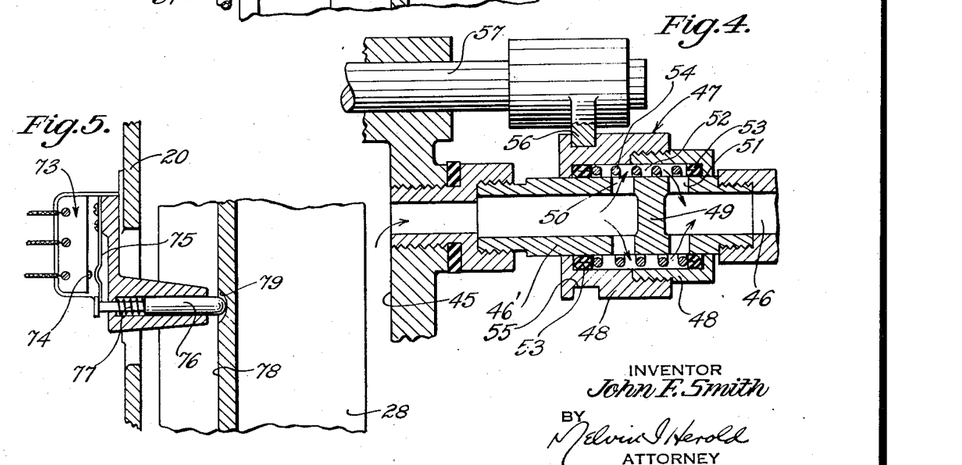
Fig. 4 is an enlarged sectional detail view of a valve mechanism showing the latter in pressure applying position.
Fig. 5 is an enlarged sectional detail of a carrier stop switch taken along line 5—5 of Fig. 1.

Conduits 46 lead from this distributor to each pressure device 22, it being understood that there is one conduit for each device, although only one is illustrated in the drawings. A valve 47 is positioned in each conduit between the distributor and its associated pressure applying device and is movable to pressure applying position where it connects the distributor with such device and to exhaust position where it cuts off the distributor from the pressure device and exhausts fluid from the latter. The valve is preferably of a sliding sleeve type, best shown in Fig. 4, and comprising a shiftable sleeve 48 slidable along a core 46', which is threaded between the distributor and the conduit 46 and forms a part of the latter. This core includes a dividing wall or septum 49, having a plurality of ports 50 on one side and 51 on the other. The combined areas of ports 50 or 51 approximate or exceed that of the conduit, so that there is no restriction in the vicinity of the valves. This, coupled with generous proportioning of the various fluid ducts affords very rapid, almost instantaneous inflating or deflating action. The sleeve 48 has an interior chamber 52 capable of spanning these ports, as shown in Fig. 4, in which pressure applying position there is communication between the distributor 45 and the pressing device 22 through conduit 46 and 46'. The chamber 52 at its ends has packing washers 53, which are urged apart into tight seating position by a spring 54, and also by fluid pressure. These washers tend frictionally to engage the valve core so as to help hold the sleeve 48 in whatever position it is set, the entire sleeve valve arrangement being inherently balanced to remain in set position. When the valve is shifted to the left, as shown in Fig. 3, the sleeve 48 exposes the ports 51 to atmosphere while cutting off passage of fluid from the distributor beyond ports 50. In this exhaust position the pad 22 is deflated.

In order to shift the sleeve valve between pressure applying and exhaust positions the sleeve 48 has an annular groove 55 into which a fork 56 is fitted. This fork is fixed to one end of a valve operating rod 57, which is slidably mounted in the rotor drum head, and has its other end projecting outwardly from the rotor toward the frame 20. This outer end of the valve operating rod 57 has a rocker 58 pivoted to it with a sufficiently loose motion to permit swinging rocker movement, the rocker being medially fulcrumed at 59 on a standard 60 fixed to the rotor.

The press at the uppermost periphery of the rotor, which is exposed above the frame, is at the operating station where completed work is removed from a deflated press, new work is inserted, and the press is inflated. Valve shifting mechanism is provided at this station in position to register with the rocker 58 associated with a press stopped at such station and comprises a double bell crank 61 having one arm provided with a pusher 62 capable of shifting the rocker 58 so as to slide the valve 48 inwardly to pressure applying position, and having another arm carrying a pusher 63 capable of moving a rocker 58 so as to move valve 48 outwardly to exhaust position. The remaining arm of the double bell crank is pivoted to a link 64 connecting it with the core 65 of an inflating solenoid 66 mounted on the frame at the operating station. This solenoid, when energized, pulls the double bell crank downwardly so that pusher 62 shifts the valve to inflating or pressure applying position. A tension spring 67 gives the double bell crank 61 a normal bias to the opposite position, where, if the registered rocker 58 should happen to be in inflating position, it would be moved to deflating position through action of the pusher 63 and spring 67. This rocker will normally approach the operating station while set in deflating position where it will just clear the pushers 62 and 63 in the normal spring biased positions of the latter. The operator, when applying pressure to work in the press at the operating station, will ordinarily just energize the inflating solenoid once in order to shift the valve to pressure applying position, but if readjustment of the work seems called for, or if for any other reason it is desired to deflate a press while it is still at the operating station, this can be done by de-energizing the inflating solenoid before the rotor is started.

Additional valve shifting mechanism is positioned one station in advance of the operating station for shifting an adjacent rocker 58 to exhaust position. This mechanism comprises a bell crank 68 carrying a pusher 69 on one arm thereof in position to register with the outer or deflating end of the rocker 58 during a rotor dwell. The remaining arm of bell crank 68 has a tension spring 70 extending from it to the machine frame and giving pusher 69 a normal bias into exhaust position from which it can be held retracted by a deflating solenoid 71 which, when energized, shifts its core 72 so as to overcome the spring 70. The deflating solenoid is connected in parallel with the motor line so that the deflating pusher is retracted during carrier movement but acts under its spring bias to shift an adjacent valve to exhaust position when the rotor is stopped.

Figure 6:
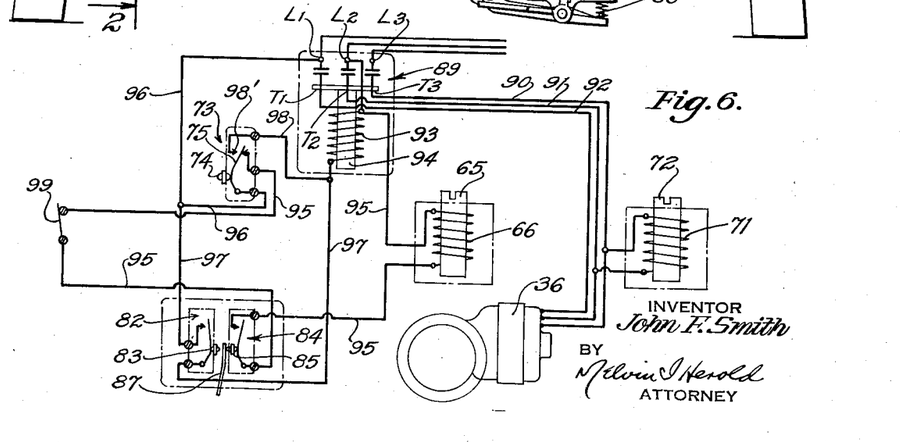
Fig. 6 is a wiring diagram of the control circuits of the machine shown in Figs. 1 to 5.

Such stopping of the rotor is effected by means of a cut-off switch controlled by a suitable cam track which may, if desired, be on the rotor drum head 28. Such a switch is shown in Figs. 5 and 6 and comprises a switch 73 mounted in a suitable casing and operable by a push button 74 normally urged in motor line closing position by a leaf spring 75, which in turn is normally urged to motor line closing position by a sliding plunger 76 biased by a compression spring 77 which is stronger than leaf spring 75. The plunger 76 extends into sliding contact with a cam track 78, forming part of drum head 28, and provided with a series of depressions 79 corresponding in number and relative position with the number of presses on the rotor periphery so that switch plunger 76 moves into one of such recesses and cuts off the driving motor each time a press reaches the operating station. Undue coasting of the rotor is prevented by a constant friction brake 80 (Figs. 1 and 2) which is spring urged constantly to bind against but not lock a brake drum 81 fixed to the drum head 29.

While rotor movement is stopped automatically as soon as the presses have been moved one step, rotor starting movement is preferably effected at the will of the machine operator by means of a switch 82 (Figs. 1 and 6) having an operating button 83. An additional switch 84 having an operating button 85 is also provided to control the inflating solenoid. These switches are arranged for operation in sequence from a pedal 86 having a leaf spring 87 extending upwardly therefrom for swinging movement between the buttons 85 and 83. The pedal is normally biased by a spring 88 to its uppermost position where leaf 87 engages switch button 85 so as to hold the inflating solenoid switch open. Partial depression of pedal 86 to inflating position causes leaf 87 to release button 85 so as to close switch 84 and energize the inflating solenoid, thus shifting the valve 47 of the press at the operating station to pressure applying position. Further depression of pedal 86 causes leaf 87 to engage the motor switch button 83 to close switch 82 and start the motor. It will be noted that by refraining from depressing the control pedal to motor starting position after the inflating switch 84 has been closed to apply pressure, the operator may if wanted, relieve this pressure by permitting the pedal to rise so as to de-energize the inflating solenoid.

The operation of these various controls will be better understood from reference to Fig. 6. Polyphase current is led from a suitable source to line terminals L1, L2 and L3 on one side of a main magnetic switch generally designated 89, having corresponding switch terminals T1, T2 and T3, from which leads 90, 91 and 92 run directly to the driving motor 36. The magnetic switch 89 is operated by a coil or magnet 93, which when energized shifts its armature 94 so as respectively to connect line terminals L1, L2 and L3 with switch terminals T1, T2 and T3, or in other words closes the switch. When the magnet 93 is not energized the switch is open and the motor is cut off. Assuming that the rotor is in dwell position with the motor cut off, and with the motor stopping switch 73 in cut-off position with its control plunger 76 resting in a depression 79 of the cam plate 78, if the operator depresses pedal 86 so as to cause leaf 87 to move to the left (Fig. 6) current is then passed from L2 through a lead 95 around the inflating solenoid 66 to switch 84, which is now closed, and thence to one side of motor cut-off switch 73. In Fig. 6 the button 74 is in the rotor dwell position shown in Fig. 5 where contact is established from lead 95 to a lead 96, and thence back to the line at L1. This serves to energize the inflating solenoid 66 and apply pressure to the fluid pressure device at the operating station. Further movement of the pedal 86 causes leaf 87 to engage motor starting switch button 83 to close the motor starting switch 82. When this occurs, current is led from L2 through the magnet 93 of the main magnetic switch and thence through a pilot lead 97 through the now closed motor starting switch 82 and back to lead 96, and thence to the line at L1, thus energizing the magnetic switch and closing the motor circuit. As soon as such motor circuit is closed the deflating solenoid 71, which is connected in parallel across two of the motor leads 90 and 91, becomes energized so as to retract the deflating valve shifting mechanism against its normal spring bias. Once the motor 36 has started and the rotor has begun to turn, the operator may release the pedal 86. In order to prevent this from cutting off the motor, current is maintained through the magnetic switch coil 93 by means of the cut-off switch 73. Assuming that the motor has been started through closure of switch 82 and has operated sufficiently to shift the operating button 74 of switch 73 through movement of the cam track depression 79 beyond the switch control plunger 76, then current will be led from L2 through the main switch magnet 93 to a lead 98, the terminal 98' of which is now permitted, in the altered or running position of button 74, to connect with the lead 96 and thence back to the line at L1. So long as current passes from L2 through the main switch magnet 93 to terminal 98' of switch 73 and back to the line, the main switch will remain closed and the motor will remain running, even though operating switch 82 in the meantime has been opened through release of pedal 86 by the operator. As soon, however, as the cut-off switch plunger 76 engages in the next cam track depression 79 the contact at 98' is broken, and switch 73 is returned to the dwell position shown in Fig. 6, where it stops the motor (switch 82 being now open)

and again prepares the inflating solenoid circuit for closure through switch 84, and a repeated cycle of operations.

A hand switch 99 is preferably inserted in the inflating solenoid circuit so that the latter may be cut out from the operating cycle at the end of a run, so that the machine can be left empty.

In operation of this form of the invention, work such as a shoe to be leveled is inserted in the press at the operating station which will be in deflated condition at this time. Pedal 86 is then depressed sufficiently to close switch 84, energizing inflating solenoid 66 and moving pusher 72 against the adjacent rocker 58, shifting valve 47, and applying pressure from the distributor to the fluid pressure device 22. During this dwell period the deflating valve shifting mechanism at the station ahead of the operating station will, under impulsion of spring 67, act to shift the rocker 58 at that station to exhaust position so that its inner end, which is pivoted to the valve operating plunger 57, will be projected from the rotor toward the frame as the deflated press approaches the operating station. This approach occurs when the operator further depresses pedal 86 so as to close the motor starting switch 82, whereupon the motor starts and continues until cut out by switch 83.

If, during this time, the operator neglected to allow the pedal 86 to return to its normal position where it serves to de-energize the inflating solenoid, the inflating pusher 62 associated with the latter would project into the path of the approaching deflated rocker arm 58, jamming these parts and preventing the rocker from moving into its registered position opposite the pushers 62 and 63. To prevent this, means are provided for compelling the return of pedal 86 to normal position during each step of carrier rotation. This means includes a cam track 100 (Figs. 1 and 2) on the rotor drum head 29. This track has a series of rises 101 corresponding in number and position with the presses on the rotor periphery. A lever 102 is pivoted to the macihne frame at 103 and carries a roller 104 capable of riding over the cam track. A link 105 connects the ends of this lever with pedal 86 and is arranged to lift the latter each time a cam rise 101 wipes beneath the roller 104, if the operator has not already permitted the pedal 86 to rise naturally under its spring bias. This assures return of the pedal leaf 87 to a position where it opens the inflating solenoid switch 84, thus in turn assuring that such solenoid will be de-energized, and the spring 67 permitted to retract the double bell crank 61 to a position where its pushers 62 and 63 will clear the approaching rocker 58, which is in pressure exhausting position.

When the deflated press reaches the operating station, the work therein, if any, is removed, and new work loaded in the press, which in turn is inflated and sent along the carrier traverse, this cycle being repeated throughout a given run.

Figures 9, 10, 11, 12, 14:
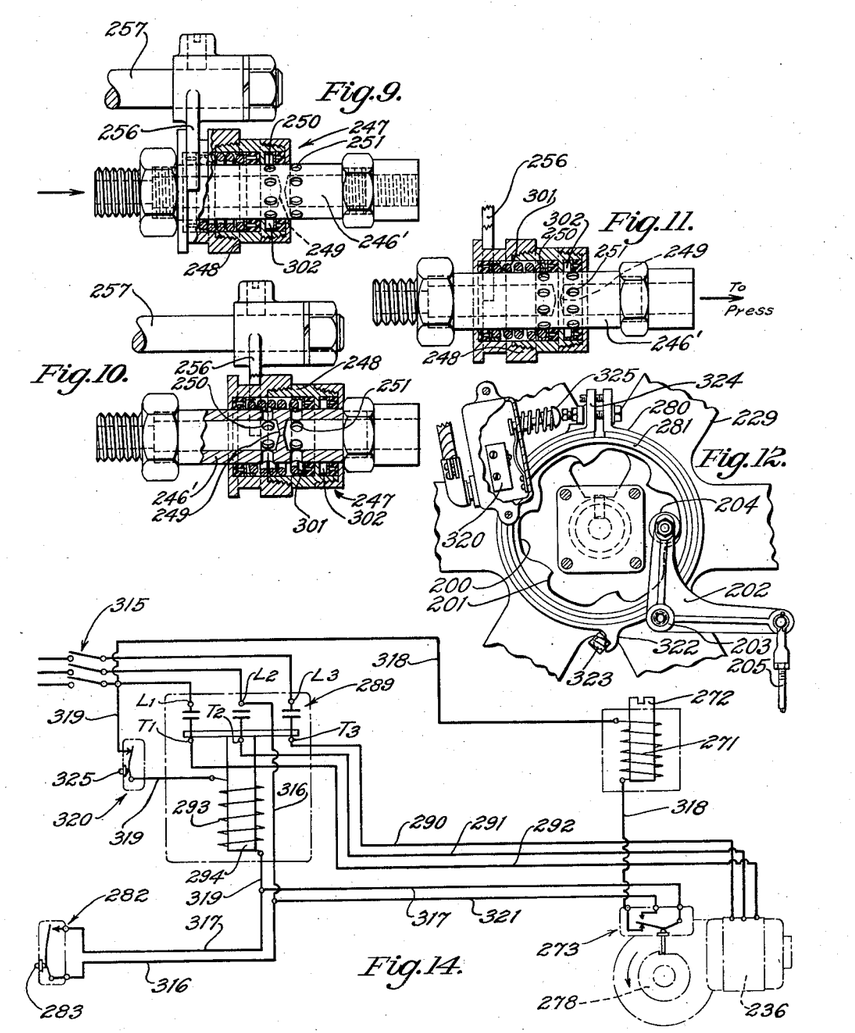
Figs. 9, 10 and 11 are detail sectional views of a valve used in the machine of Fig. 7, showing different valve positions.
Fig. 12 is a fragmentary front elevation taken substantially along line 12—12 of Fig. 8.
Fig. 14 is a wiring diagram of the control circuits of the machine shown in Figs. 7 to 12.

In the form of machine shown in Figs. 7 to 14 the presses 21, having fluid pressure devices 22, are mounted on a periphery of a rotor generally designated 226 comprising drum heads 228 and 229 joined by struts 230. As in the first form, air is led into a central distributor 245 on the rotor from which individual conduits 246 run to the several fluid pressure devices. In each conduit there is a valve 247, the details of which are shown in Figs. 9 to 11. Each valve comprises a core 246' forming a portion of the conduit between the distributor and pressure device, and having an interior dividing wall 249 on either side of which are ports 250 and 251. A valve sleeve 248 slidably embraces the core and is provided with separate interior chambers 301 and 302 arranged to provide a three-way action.

When the sleeve 248 is in the extreme left position of Fig. 9, air from the distributor is cut off in valve chamber 302 while air from each press pad is exhausted to atmosphere through the exposed ports 251.

In the pressure applying or inflating position of Fig. 10 the valve sleeve 248 occupies its other extreme right hand position in which the chamber 301 spans and affords communication between ports 250 and 251, connecting the distributor with the press pad.

In the intermediate cut-off position of Fig. 11 air from the distributor is cut off at chamber 301 while air from the press is trapped at chamber 302.

Each valve is shiftable to any of these positions by valve operating parts, including a rod 257 having a fork 256 at its inner end extending into an annular groove in the sleeve 248. Each valve rod 257 has a rocker 258 pivoted to its outer end, such rocker being mounted on the rotor.

Pedal operated valve shifting mechanism is provided on the frame for moving the valves of a press at the topmost operating station to either inflating or deflating position and for moving the valve of a press disposed on the opposite or lower side of the rotor to intermediate cut-off position. This shifting mechanism includes a foot pedal 303 having a crank arm 304 fixed to it which in turn is pivoted to a thrust link 305. This link turns a bell crank 306 to which a pull link 307 is pivoted. Link 307 is connected with one arm 308 of a bell crank, to the other arm of which is fixed a pusher 309 engageable against the free end of an adjacent rocker 258. Also connected to the bell crank arm 308 is a further pull link 310, the upper end of which is pivoted to arm 311 of a double bell crank 261 at the operating station. The arms of this double bell crank respectively carry pushers 262 and 263 adapted to register with the rocker 258 of the valve of the press at the operating station. The arrangement of the pedal linkage is such that upon depression of pedal 303, pull links 307 and 310 are pulled downwardly causing the pusher 262 to shift an opposed valve from exhaust position to pressure applying position, and also causing pusher 309 to shift its opposed valve from pressure applying position to intermediate cut-off position. To this end the bell crank arm 308 is made about twice as long as bell crank arm 311, while the respective pusher arms are of approximately equal lengths so that the travel of pusher 309 is only about half that of pushers 262 or 263. Tension springs 312 extending between bell crank arm 308 and studs fixed to the frame normally urge the pull links and the treadle upwardly, this movement being limited by a stop screw 313, which is adjustably fixed on the bracket carrying the linkage bell crank 306. The operator, by moving pedal 303 down or letting it up, can through pushers 262 and 263 shift the valve at the operating station between its extreme pressure applying or exhaust positions at will, but the pusher 309 will only act once to shift its opposed valve to intermediate cut-off position.

Each pressure device is normally exhausted or deflated by a solenoid controlled valve shifting mechanism located one station in advance of the operating station. This comprises a solenoid 271 (Fig. 7), the core 272 of which is linked to a deflating bell crank 268 carrying a pusher 269 arranged to shift an opposed valve rocker 258 so as to move its associated valve from intermediate cut-off position to exhaust position. The pusher 269 is normally retracted by springs 314 but is moved inwardly to exhaust position when its solenoid is energized, being oppositely arranged from the first described pusher 69 in this respect. The solenoid 271 is not energized until the final stage of the rotor dwell period so that deflation does not occur until just before the press at the deflating station begins to move toward the operating station. This maintains the work under pressure for a maximum period and circumvents dropping of the work from the tilted press at the deflating station since the press begins to assume a more upright position immediately after deflation has begun.

Figures 7, 13:
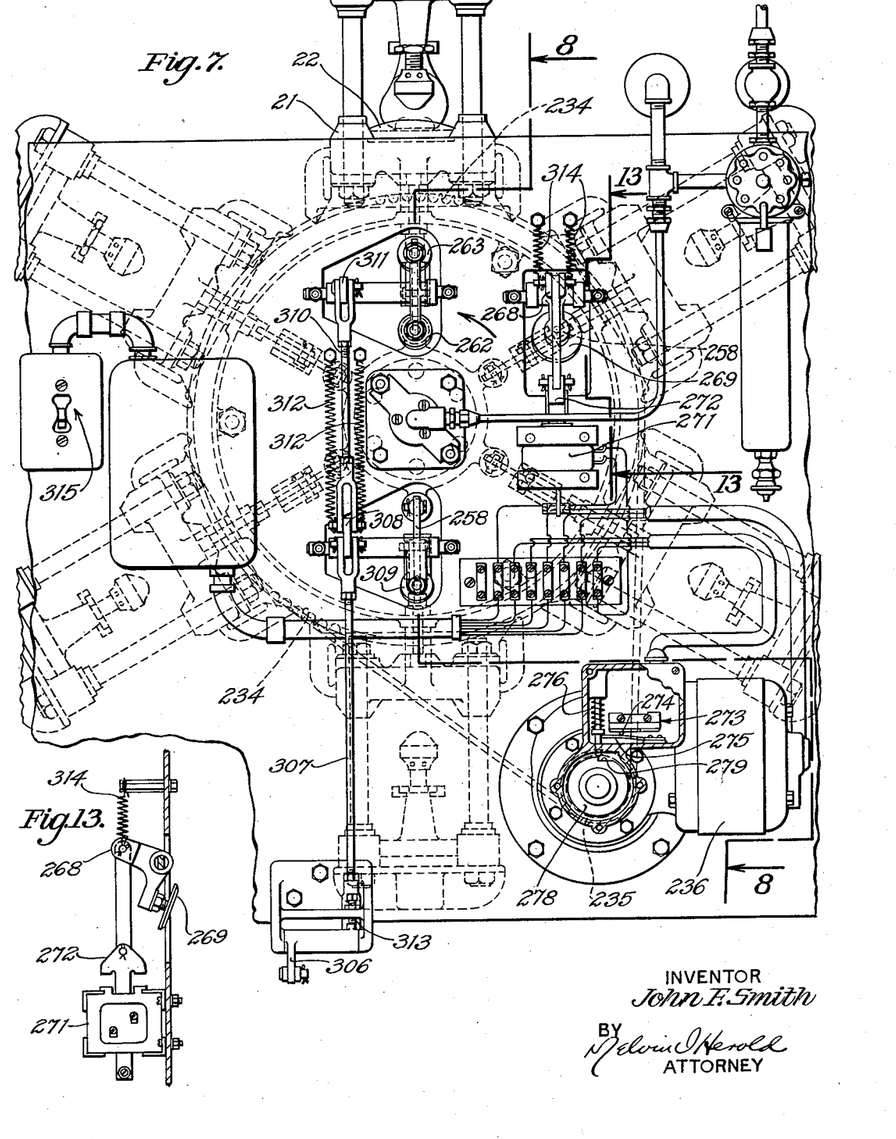
Fig. 7 is a fragmentary rear elevation of another form of machine embodying principles of the invention.
Fig. 13 is a fragmentary side view of the deflating mechanism used on the machine of Fig. 7.
Figure 8:
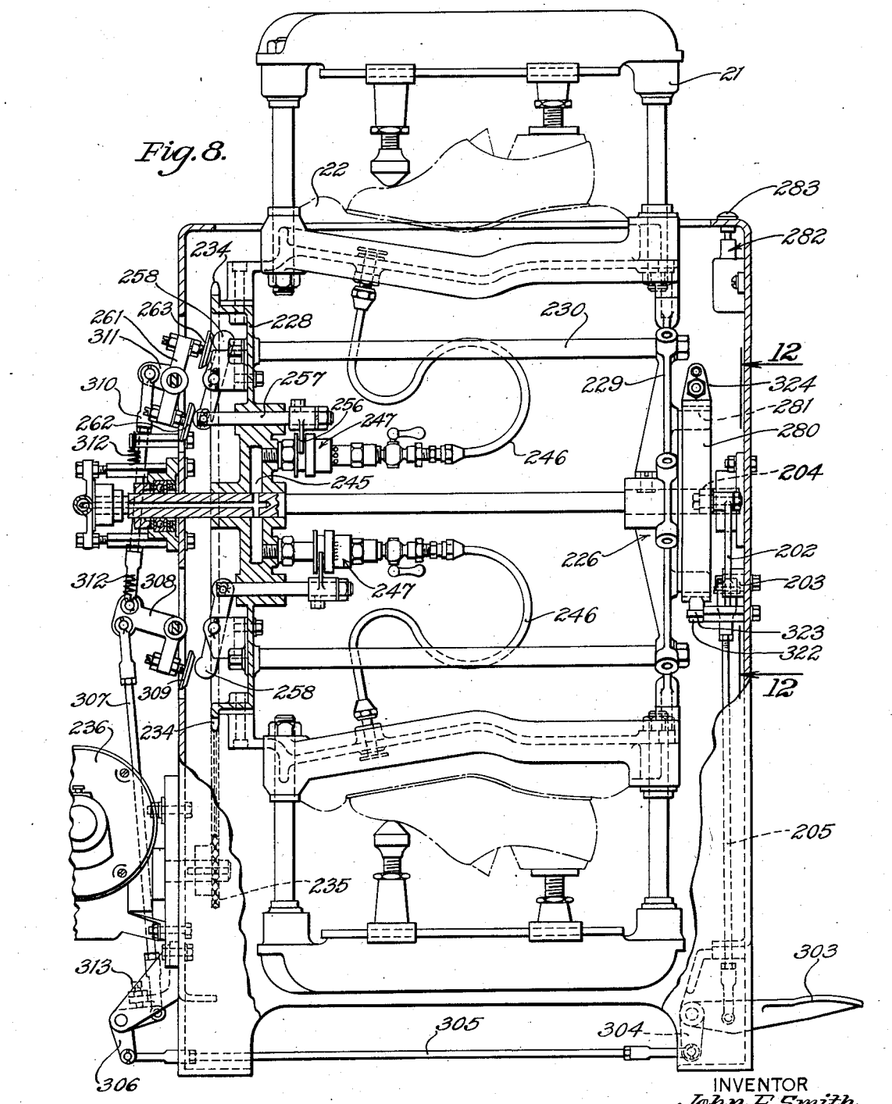
Fig. 8 is a transverse sectional view taken substantially along line 8—8 of Fig. 7.

The rotor is turned in a counter clockwise direction as viewed in Fig. 7 by means of a driving sprocket 235 turned by an electric motor 236 to drive a chain over a driven sprocket 234 on the periphery of rotor drum head 228. The ratio of sprockets 234 and 235 is determined by the number of presses spaced about the rotor, there being six presses in the illustrated machine with a 6 to 1 ratio between the sprockets so that one full revolution of driving sprocket 235 advances the rotor just one press spacing.

A cut-off switch for stopping the rotor is provided in conjunction with the driving sprocket. This is a two-way switch generally designated 273 and has an operating button 274 controlled by a cam 278 keyed for rotation with sprocket 235. This cam has a single depression 279 so that once each revolution it moves the cut-off switch 273 to motor stopping position through the agency of a spring pressed plunger 276, which wipes against the cam periphery and controls a leaf spring 275 which engages against and causes movement of the switch operating button 274. As will be explained more fully, the circuit is so arranged that each time plunger 276 drops into cam depression 279 the motor is stopped.

A motor starting switch generally designated 282 is mounted on the frame near the operating station where its circuit closing push button 283 is readily manually accessible for operation as soon as the press has been loaded.

The control circuit for starting and stopping the motor and operating the deflater is shown in Fig. 14. Polyphase current is led from a suitable source through a hand control switch 315, used for cutting off the entire machine at the end of a run, to line terminals $L_1$, $L_2$ and $L_3$, which are adapted to be respectively contacted with magnetic switch terminals $T_1$, $T_2$ and $T_3$ whenever the magnetic switch generally designated 289 is closed through energization of its magnet or coil 293 to move its armature 294 to switch closing position. This connects the motor leads 290, 291 and 292 with the line, and starts the motor.

In order thus to energize the main magnetic switch, assuming the latter to be de-energized during a rotor dwell period when the control plunger 276 of cut-off switch 273 rests in the cam depression 279, the starting push button 283 is pressed to close switch 282. When this occurs current is led from line terminal $L_2$ through a lead 316 through switch 282 to a lead 317 and thence to the common terminal of switch 273 and across such switch to a lead 318 (this being possible because switch 273 is in the dwell position) which passes around the deflating solenoid 271 and thence returns to line L₁. From this it will be seen that the deflating solenoid is energized through closure of the starting switch but must be actuated during a rotor dwell because of the switch 273. This switch cuts out the deflating solenoid and permits its spring to return the deflating pusher to retracted inactive position as soon as the cam 278 turns sufficiently to shift switch 273 from its dwell to its running position. Because the deflating valve remains in whatever position it is set, the shifting by the deflating pusher need only be momentary so that it can readily be thus retracted soon after the motor starts turning. In actual practice this deflating valve shifting operation occurs during the final stages of the carrier dwell and is completed an appreciable time before the rotor begins to move due to inertia in the magnetic switch 289 and to driving chain slack. The closure switch 282 also causes passage of current from line L₂ through leads 316 and 317 to a lead 319 which passes around the magnetic switch coil 293 and thence through a switch 320, which may be regarded as normally closed, and thence back to the line L₁. This energizes the magnetic switch and starts the motor. After the motor has turned enough to shift the cut-out switch 273 from dwell to running position the starting switch 282 may be opened without de-energizing the main magnetic switch until such time as it is cut out by the switch 273. Thus in Fig. 14 where the switch 273 is shown in dwell position, if it be assumed that it is shifted to its alternative running position, current will pass from line L₂ through lead 316 to a lead 321, thence to the common terminal of switch 273 back along lead 317 to the magnetic switch lead 319 through the switch coil 293 and thence back to the line L₁, maintaining such coil energized until such time as lead 321 is disconnected from lead 317 by a shifting of switch 273 back to dwell position, which occurs after one full rotation of the cam 278.

Since the rocker 258 of the press approaching the operating station is in exhaust position the pushers 262 and 263 at such station should be in corresponding inactive or non-inflating position during the time such rocker 258 approaches and registers with them. To assure this the treadle 303 is automatically raised during rotor movement by means of the mechanism best shown in Figs. 8 and 12. This comprises a cam track 200 fixed to the rotor drum head 229 and having cam risers 201 corresponding in number and position with the presses on the rotor periphery. A roller 204 rides against this cam track and is mounted on one arm of a bell crank lever 202 pivoted to the frame at 203 and having its other arm attached to a link 205 which is connected with the pedal 303. This arrangement assures positive lifting of the pedal at proper intervals to avoid interference between the valve shifting mechanism and the valve operating parts. When each press is at the operating station the roller 204 will be opposite a low point in the cam track so that the pedal may be freely operated back and forth between inflating and deflating positions, but at other times during carrier movement, shifting of the pedal to inflating position will be precluded. Thus, if the operator were to attempt to depress the pedal 303 during, say, the latter stage of carrier movement at a time before the rockers 258 were brought opposite the shifting mechanisms 262, 263, and 309, he would find the pedal to be unyielding and incapable of depression because of the opposition of cam risers 201. Only after the carrier has reached dwell position, with the valve shifting parts properly registered, will he be able to work the pedal up and down so as to vary the valve shifting mechanism between exhaust and inflating positions. This serves to avoid jamming of the machine parts through premature operation of the pedal, which might otherwise readily occur with an operator who did not thoroughly understand the cycle of machine operation, or who through overanxiety to get on with the loading operation, tends to step on the pedal at improper times.

In Fig. 12 there is also shown a combined anti-coasting brake and motor direction guarantee. This latter is useful in cases where a polyphase motor is employed, since in initially wiring such motors it is difficult to tell in advance which way the motor will turn when the current is applied. To prevent unwanted reverse turning of a newly wired motor, which might cause interference among the machine parts, the constant friction brake band 280 is snugly mounted on a brake drum 281 fixed to the rotor. Projecting from the band is a finger 322 which abuts against a stud 323 on the machine frame. So long as the rotor is turned in the proper clockwise direction, as viewed in Fig. 12, the stud 323 halts finger 322, and the brake band 280 rubs against its drum to prevent undue coasting. If, however, the motor were wired so as to turn the rotor in an improper counter-clockwise direction the drum would pick up the brake band and carry it with it until the clamping flange 324 abutted and depressed the operating button 325 of a direction guarantee switch 320, opening the latter. As seen in Fig. 14 this switch 320 is in the main magnetic switch line and promptly de-energizes such switch if the motor starts in the wrong direction, thus opening the magnetic switch and stopping the motor, which cannot be continuously run until its polyphase terminals are properly wired.

In operation of the form shown in Figs. 7 to 14 the operator loads work in a deflated press at the operating station. He then steps on pedal 303 causing pusher 262 to shift the adjacent valve 247 from deflating position to inflating position. At the same time pusher 309 shifts its adjacent valve from pressure applying position to intermediate cut-off position. The pedal 303 is held down for a short time while the starting switch 282 is closed. This actuates the deflating pusher 269 causing the latter to shift the valve of the press in advance of the operating station from intermediate cut-off position to exhaust position. Promptly after actuation of the deflating pusher the rotor begins turning and as soon as the rocker 258 of the recently loaded and inflated press clears the valve shifting mechanism 262, 263 the pedal 303 may be released by the operator. If this were done before the rocker 258 cleared the valve shifting mechanism the pusher 263 would shift the valve back to deflating position, and while this may occasionally be desirable when readjustment of the work is wanted, ordinarily the pedal is not lifted until the described clearance has occurred. Once this clearance does obtain, the pedal 303 is automatically raised, if needed, by the rotor cam 200. The switch 282 is released or opened just after the rotor begins turning, thus preparing the motor circuit for control by the automatic cut-out switch 273 which stops the previously deflated press upon its subsequent arrival at the operating station, where the cycle of operations is repeated.

Both described forms give rapid action and flexible control and are otherwise well suited to fulfill the intended functions of the invention. The machine is especially useful for work such as sole leveling and shank molding where no assembly of parts is needed during the loading operation so that the operator can load and subject the work to pressure with great rapidity without being materially delayed in his production through waiting for the machine. The present machine also efficiently utilizes quick setting adhesives in sole affixing, and in general has the advantage of considerably reducing the inflating, deflating and carrier moving time elements as critical factors in the total time consumed for any given type of pressing operation.

While the illustrated forms particularly described have been shown with pad equipped shoe holding presses of a type suitable for sole leveling, sole affixing, sole laying, channel laying, etc., other special or suitable types of presses adapted for different work, such as sole molding, sticking bottom assembly parts together prior to their attachment to the shoe, etc., may be mounted on the rotor and other fluid pressure operated devices than an inflated pad may be employed.

The illustrated valve actuating mechanisms are positive and rapid in their action and subject to ready control, but it will be understood that some benefits of the general organization can be obtained while substituting other valve shifting mechanisms, for example fixed cams properly distributed around the adjacent rotor path in position to engage and shift the valve operating parts, and such cams might be utilized in lieu of any one or all of the described shifting mechanisms.

Also, while a circular rotor type of carrier is most amenable to use in the general organization, it will be appreciated that certain benefits of the invention can be obtained through using the described types of fluid pressure and carrier driving controls, or some among them, in combination with other forms of carriers, including conveyors.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a machine for pressing shoe work, the combination comprising a rotary carrier having a plurality of presses thereon, each press having a fluid operated pressure applying device associated therewith, a common source of pressure fluid, conduits connecting each device with said source, a valve in each conduit movable to pressure applying position where it connects its associated device with said source and to exhaust position where it exhausts fluid from said device, means for driving said carrier step by step to present said presses in turn at an operating station, means controllable by an operator for moving the valve of a press at said operating station to pressure applying position, carrier starting means controllable at the will of an operator to start said driving means, carrier stopping means for automatically stopping said driving means when said carrier has advanced one step, mechanism located in advance of said operating station for moving an adjacent valve to its exhaust position, and means operable during a dwell of said carrier for controlling operation of said mechanism by said carrier starting and stopping means.

2. In a machine for pressing shoe work the combination comprising a rotary carrier having a plurality of presses thereon, each press having a fluid operated pressure applying device associated therewith, a common source of pressure fluid, conduits connecting each device with said source, a valve in each conduit movable to pressure applying position where it connects its associated device with said source and to exhaust position where it exhausts fluid from said device, means for driving said carrier step by step to present said presses in turn at an operating station, means for moving the valve of a press at said operating station to pressure applying position, and means operatively coupled with said driving means for moving said valve to exhaust position at the final portion of the last dwell period prior to return of its press to said operating station.

3. In a machine for pressing shoe work, the combination comprising a rotary carrier having a plurality of presses thereon, each press having a fluid operated pressure applying device associated therewith, a common source of pressure fluid, conduits connecting each device with said source, a valve in each conduit movable to pressure applying position where it connects its associated device with said source and to exhaust position where it exhausts fluid from said device, means for driving said carrier step by step to present said presses in turn at an operating station, means for moving the valve of a press at said operating station to pressure applying position, mechanism located in advance of said operating station capable of moving an adjacent valve to exhaust position, and control means for said mechanism arranged automatically to project it into exhaust position only during the final portion of carrier dwell, and automatically to retract it when the carrier moves.

4. In a machine for pressing shoe work, the combination comprising a rotary carrier having a plurality of presses thereon, each press having a fluid operated pressure applying device associated therewith, a common source of pressure fluid, conduits connecting each device with said source, a valve in each conduit movable to pressure applying position where it connects its associated device with said source and to exhaust position where it exhausts fluid from said device, means for driving said carrier step by step to present said presses in turn at an operating station, means for moving the valve of a press at said operating station to pressure applying position, and common means controllable at the will of the operator for moving the valve of a press in advance of said operating station to exhaust position and for promptly thereafter starting rotation of said carrier by said driving means.

5. In a machine for pressing shoe work, the combination comprising a carrier having a plurality of presses thereon, driving means for intermittently moving said carrier to bring said presses in turn to an operating station, means for applying pressure to a press at said operating station, means for relieving pressure from a press in advance of said operating station, and a common control for actuating said pressure relieving means and for then starting rotation of said carrier by said driving means whereby said pressure relieving means does not act until the final portion of a carrier dwell.

6. In a machine for pressing shoe work, the combination comprising a rotary carrier having a plurality of presses thereon, each press having a fluid operated pressure applying device associated therewith, a common source of pressure fluid, conduits connecting each device with said source, a valve in each conduit movable to pressure applying position where it connects its associated device with said source and to exhaust position where it exhausts fluid from said device, means for driving said carrier step by step to present said presses in turn at an operating station, an electric motor for driving said carrier, magnetic means for moving the valve of a press at said operating station to pressure applying position, a second magnetic means for moving the valve of a press in advance of said operating station to exhaust position, switches controlling said motor and both said magnetic means, and a single operating pedal for said switches.

7. In a machine for pressing shoe work, the combination comprising a carrier having a plurality of presses thereon, electric driving means for moving said carrier to bring said presses in turn to an operating station, magnetically controlled means for applying pressure to a press at said operating station, switches for said driving means and said pressure applying means, and a single pedal arranged selectively to operate said switches.

8. In a machine for pressing shoe work, the combination comprising a carrier having a plurality of presses thereon, electric driving means for moving said carrier to bring said presses in turn to an operating station, magnetically controlled means for applying pressure to a press at said operating station, a second magnetically controlled means for relieving pressure from another press, a single means controllable by an operator for sequentially actuating said first named magnetically controlled means and said driving means, and means dependent on operation of said driving means for actuating said second named magnetically controlled means.

9. In a machine for pressing shoe work, the combination comprising a rotary carrier having a plurality of presses thereon, each press having a fluid operated pressure applying device associated therewith, a common source of pressure fluid, conduits connecting each device with said source, a valve in each conduit movable to pressure applying position where it connects its associated device with said source and to exhaust position where it exhausts fluid from said device, means for driving said carrier step by step to present said presses in turn at an operating station, and magnetically operated means at said operating station for locating an adjacent valve in pressure applying position.

10. In a machine for pressing shoe work, the combination comprising a rotary carrier having a plurality of presses thereon, each press having a fluid operated pressure applying device associated therewith, a common source of pressure fluid, conduits connecting each device with said source, a valve in each conduit movable to pressure applying position where it connects its associated device with said source and to exhaust position where it exhausts fluid from said device, means for driving said carrier step by step to present said presses in turn at an operating station, and treadle controlled valve shifting mechanism at said operating station operable to move said valve to pressure applying position or to exhaust position at the will of the operator.

11. In a machine for pressing shoe work, the combination comprising a rotary carrier having a plurality of presses thereon, each press having a fluid operated pressure applying device associated therewith, a common source of pressure fluid, conduits connecting each device with said source, a valve in each conduit movable to pressure applying position where it connects its associated device with said source and to exhaust position where it exhausts fluid from said device, means for driving said carrier step by step to present said presses in turn at an operating station, valve shifting mechanism at said operating station capable of shifting an adjacent valve between pressure applying and exhaust positions, magnetic means for moving said mechanism to shift said valve to one of said positions, and spring means biasing said mechanism to shift said valve to the other of said positions.

12. In a machine for pressing shoe work, a movable carrier having a plurality of presses thereon, each press having a fluid operated pressure applying device associated therewith, driving means for moving said presses around a closed path including an operating station, means at said operating station controllable at the will of the operator for supplying fluid under pressure to an adjacent device, cut-off means beyond said station and operable in unison with said first named means for cutting off the supply of fluid to another device and trapping its contained fluid therein, and exhaust means beyond said cut-off means and in advance of said operating station for exhausting fluid from a third device.

13. In a machine for pressing shoe work, a movable carrier having a plurality of presses thereon, each press having a fluid operated pressure applying device associated therewith, driving means for moving said presses around a closed path including an operating station, common means for supplying fluid under pressure to a device at said operating station and for cutting off the supply of fluid to another device and trapping its contained fluid therein, and separate means independent of said common means for exhausting trapped pressure fluid from a third device.

14. In a machine for pressing shoe work, a movable carrier having a plurality of presses thereon, each press having a fluid operated pressure applying device associated therewith, a source of fluid pressure, conduits connecting each device with said source, a three-way valve in each conduit movable to pressure applying position where it connects its associated device with said source, to cut-off position where it cuts off said source from said device and locks fluid in the latter, and to exhaust position where it cuts off said source from said device and exhausts the latter, and mechanisms for moving one valve to said pressure applying position, another valve to said cut-off position, and a third valve to said exhaust position.

15. In a machine for pressing shoe work, a movable carrier having a plurality of presses thereon, each press having a fluid operated pressure applying device associated therewith, a source of fluid pressure, conduits connecting each device with said source, a three-way valve in each conduit movable to pressure applying position where it connects its associated device with said source, to cut-off position where it cuts off said source from said device and locks fluid in the latter, and to exhaust position where it cuts off said source from said device and exhausts the latter, driving means for bringing said presses in turn to an operating station, and operator controlled valve shifting mechanism operative to move the valve of a device at said operating station to said pressure applying position and to move the valve of a second device beyond said station to said cut-off position.

16. In a machine for pressing shoe work, a movable carrier having a plurality of presses thereon, each press having a fluid operated pressure applying device associated therewith, a source of fluid pressure, conduits connecting each device with said source, a three-way valve in each conduit movable to pressure applying position where it connects its associated device with said source, to cut-off position where it cuts off said source from said device and locks fluid in the latter, and to exhaust position where it cuts off said source from said device and exhausts the latter, driving means for bringing said presses in turn to an operating station, and operator controlled valve shifting mechanism operative to move the valve of a device at said operating station to said pressure applying position and to move the valve of a second device beyond said station to said cut-off position, and additional valve shifting means located beyond said second device and in advance of said operating station to shift an adjacent valve to said exhaust position.

17. In a machine for pressing shoe work, a movable carrier having a plurality of presses thereon, each press having a fluid operated pressure applying device associated therewith, a source of fluid pressure, conduits connecting each device with said source, a three-way valve in each conduit movable to pressure applying position where it connects its associated device with said source, to cut-off position where it cuts off said source from said device and locks fluid in the latter, and to exhaust position where it cuts off said source from said device and exhausts the latter, an operator controlled treadle, valve shifting means actuated by said treadle capable of moving one of said valves to said pressure applying position, and additional valve shifting means actuated by said treadle capable of moving another valve to said cut-off position.

18. In a machine for pressing shoe work, a movable carrier having a plurality of presses thereon, each press having a fluid operated pressure applying device associated therewith, a source of fluid pressure, conduits connecting each device with said source, a three-way valve in each conduit movable to pressure applying position where it connects its associated device with said source, to cut-off position where it cuts off said source from said device and locks fluid in the latter, and to exhaust position where it cuts off said source from said device and exhausts the latter, an operator controlled treadle, valve shifting means actuated by said treadle capable of selectively moving one of said valves between said deflating and pressure applying positions, and additional valve shifting means actuated by said treadle capable of moving another valve from said pressure applying position to said cut-off position.

19. In a machine for pressing shoe work, a movable carrier having a plurality of presses thereon, each press having a fluid operated pressure applying device associated therewith, a source of fluid pressure, conduits connecting each device with said source, a three-way valve in each conduit movable to pressure applying position where it connects its associated device with said source, to cut-off position where it cuts off said source from said device and locks fluid in the latter, and to exhaust position where it cuts off said source from said device and exhausts the latter, an operator controlled treadle, valve shifting means actuated by said treadle capable of moving one of said valves to said pressure applying position, and additional valve shifting means actuated by said treadle capable of moving another valve to said cut-off position, driving means for moving said carrier intermittently, and means responsive to actuation of said driving means for shifting a third valve from said cut-off position to said exhaust position.

20. In a machine for pressing shoe work, a movable carrier having a plurality of presses thereon, each press having a fluid operated pressure applying device associated therewith, a source of fluid pressure, conduits connecting each device with said source, a three-way valve in each conduit movable to pressure applying position where it connects its associated device with said source, to cut-off position where it cuts off said source from said device and locks fluid in the latter, and to exhaust position where it cuts off said source from said device and exhausts the latter, driving means for moving said carrier step by step to bring each press in turn to a pressure applying station, then move it to a cut-off station and then move it to an exhaust station, and valve shifting mechanism at each of said stations adapted to move a press valve to the position characterized by such station.

21. In a machine for pressing shoe work, the combination comprising a rotary carrier having a plurality of presses thereon, each press having a fluid operated pressure applying device associated therewith, a common source of pressure fluid, conduits connecting each device with said source, a valve in each conduit movable to pressure applying position where it connects its associated device with said source and to exhaust position where it exhausts fluid from said device, means for driving said carrier step by step to present said presses in turn at an operating station, an operator controlled treadle, and means responsive to operation of said treadle for moving the valve of a device at said operating station to pressure applying position, for moving another valve to exhaust position, and for starting said driving means.

22. In a machine for pressing shoe work, the combination comprising a rotary carrier having a plurality of presses thereon, each press having a fluid operated pressure applying device associated therewith, a common source of pressure fluid, conduits connecting each device with said source, a valve in each conduit movable to pressure applying position where it connects its associated device with said source and to exhaust position where it exhausts fluid from said device, means for driving said carrier step by step to present said presses in turn at an operating station, an operator controlled treadle, means actuated in response to one position of said treadle for moving the valve of a device at said operating station to pressure applying position, and means actuated in response to another position of said treadle for moving another valve to exhaust position.

23. In a machine for pressing shoe work, the combination comprising a rotary carrier having a plurality of presses thereon, each press having a fluid operated pressure applying device associated therewith, a common source of pressure fluid, conduits connecting each device with said source, a valve in each conduit movable to pressure applying position where it connects its associated device with said source and to exhaust position where it exhausts fluid from said device, means for driving said carrier step by step to present said presses in turn at an operating station, magnetically operated means for moving the valve of a device at said operating station to pressure applying position, magnetically operated means for moving another valve to exhaust position, and separate switches for operating each of said magnetically operated means in sequence.

24. In a machine for pressing shoe work, the combination comprising a carrier having a plurality of valve equipped presses thereon, electric driving means for moving said carrier to bring said presses in turn to an operating station, magnetically controlled means for operating a press valve to apply pressure to a press at said station, and means for energizing said magnetically controlled means and said driving means at the will of the operator.

25. In a machine for pressing shoe parts, the combination comprising, a frame, a rotor mounted thereon, a plurality of presses carried by said rotor and each having a fluid operated pressure device associated therewith, a central fluid distributor on said rotor and means for maintaining fluid under pressure therein, conduits leading from said distributor to each of said devices, a sliding sleeve valve in each conduit movable to pressure applying position where it connects its associated device with said distributor and to exhaust position where it exhausts fluid from said device, said valves being balanced to remain where set until positively shifted to a different position, an operating rod for each valve slidably mounted in said rotor and having its end extending toward said frame, and spaced valve shifting mechanisms on said frame successively engageable with said rods to move each valve to pressure applying position, and thereafter to exhaust position.

26. In a machine for pressing shoe parts, the combination comprising, a frame, a rotor mounted thereon, a plurality of presses carried by said rotor and each having a fluid operated pressure device associated therewith, a central fluid distributor on said rotor, means for constantly maintaining fluid under pressure therein, conduits leading from said distributor to each of said devices, a valve in each conduit movable to pressure applying position where it connects its associated device with said distributor and to exhaust position where it exhausts fluid from said device, said valves being inherently balanced to remain in any position in which they are set, an operating rod for each valve movably mounted on said rotor and each having an end extending toward said frame, rockers swingable on said rotor and each having an end pivoted to one of said rods, valve shifting mechanism on said frame capable of moving one of said rockers to set its associated valve in pressure applying position, and additional valve shifting mechanism independent of and spaced from said first named mechanism for moving said rocker to set its associated valve in exhaust position after rotation of said rotor.

27. In a machine for pressing shoe parts, the combination comprising, a frame, a rotor mounted thereon, a plurality of presses carried by said rotor and each having a fluid operated pressure device associated therewith, a central fluid distributor on said rotor, means for constantly maintaining fluid under pressure therein, conduits leading from said distributor to each of said devices, a valve in each conduit movable to pressure applying position where it connects its associated device with said distributor and to exhaust position where it exhausts fluid from said device, said valves being inherently balanced to remain in any position in which they are set, an operating rod for each valve movably mounted on said rotor and each having an end extending toward said frame, rockers swingable on said rotor and each having an end pivoted to one of said rods, a rocker swingably mounted at an operating station on said frame, and means controllable at the will of the operator for causing said second rocker selectively to push either end of an adjacent rocker on the rotor to shift its associated valve to pressure applying or to exhaust position.

28. A combination in accordance with claim 27 having additional valve shifting mechanism on the frame at a point in advance of said operating station capable of shifting an adjacent valve to exhaust position.

29. A combination in accordance with claim 27 having rotor driving means and additional valve shifting mechanism on the frame at a point in advance of said operating station capable of shifting an adjacent valve to exhaust position, said additional valve shifting mechanism being actuated in conjunction with said rotor driving means.

30. In a machine for pressing shoe parts, the combination comprising, a frame, a rotor mounted thereon, a plurality of presses carried by said rotor and each having a fluid operated pressure device associated therewith, a central fluid distributor on said rotor, means for constantly maintaining fluid under pressure therein, conduits leading from said distributor to each of said devices, a three-way valve in each conduit movable to pressure applying position where it connects its associated device with said distributor, to cut-off position where it cuts off said distributor from said device and traps fluid in the latter, and to exhaust position where it cuts off said distributor from said device and exhausts fluid from the latter, said valves being inherently balanced to remain in any position to which they are shifted, an operating rod for each valve movably mounted on said rotor and extending toward said frame, rockers swingable on said rotor and each having an end pivoted to one of said rods, a movable pusher on said frame adapted to move an adjacent rocker to shift its associated valve to pressure applying position, and a second movable pusher on said frame at a point beyond said first pusher adapted to move an adjacent rocker to shift its associated valve to cut-off position.

31. A combination according to claim 30 having a third movable pusher on said frame at a point beyond said second pusher and in advance of said first named pusher adapted to move an adjacent rocker to shift its associated valve to exhaust position.

32. A combination according to claim 30 wherein a single operator controlled means is provided for actuating both of said movable pushers.

33. A combination according to claim 30 wherein a single operator controlled means is provided for actuating both of said movable pushers, and a third movable pusher is provided on said frame at a point beyond said second pusher and in advance of said first named pusher and is adapted to move an adjacent rocker to shift its associated valve to exhaust position.

34. In a machine for pressing shoe work, the combination comprising, a movable carrier having a plurality of presses mounted thereon, a fluid pressure operated device associated with each press, a source of fluid pressure, conduits between said source and each of said devices, a valve in each conduit movable to pressure applying position where it connects its associated device with said source and to exhaust position where it exhausts fluid from said device, movable operating parts on said carrier, movable valve shifting mechanism adjacent said carrier adapted to register with and move said operating parts, and means dependent on movement of the carrier for compelling said valve shifting mechanism to clear said valve operating parts as the latter move into registry therewith.

35. In a machine for pressing shoe work, the combination comprising, a movable carrier having a plurality of presses mounted thereon, a fluid pressure operated device associated with each press, a source of fluid pressure, conduits between said source and each of said devices, a valve in each conduit movable to pressure applying position where it connects its associated device with said source and to exhaust position where is exhausts fluid from said device, operator controlled means at a station along said carrier for moving a valve from exhaust to pressure applying position, and means for preventing such movement of said operator controlled means until a valve has been moved by said carrier into cooperative relation therewith.

36. In a machine for pressing shoe work, the combination comprising, a movable carrier having a plurality of presses mounted thereon, a fluid pressure operated device associated with each press, a source of fluid pressure, conduits between said source and each of said devices, a valve in each conduit movable to pressure applying position where it connects its associated device with said source and to exhaust position where it exhausts fluid from said device, an operating means for each valve mounted on said carrier for movement between extended and retracted position, valve shifting mechanism at a station along said carrier adapted to engage and push an adjacent valve operating means from extended to retracted position, and means for preventing said mechanism from getting into the path of an extended valve operating means during movement of the carrier.

37. In a machine for pressing shoe work, the combination comprising, a carrier, a plurality of presses carried by said carrier and each having a fluid operated pressure applying device associated therewith, means for intermittently moving said carrier, operator controlled means for applying fluid pressure to one of said devices during a carrier dwell, and means dependent on carrier movement for preventing operation of said operator controlled means to apply pressure except during a dwell.

38. In a machine for pressing shoe work, the combination comprising, a carrier, a plurality of presses carried by said carrier and each having a fluid operated pressure applying device associated therewith, means for moving said carrier, means for supplying fluid under pressure to said devices in turn, a pedal movable by the operator from inactive to active position to actuate said fluid supplying means, and means dependent on carrier movement for compelling return of said pedal to inactive position.

39. In a machine for pressing shoe work, the combination comprising, a frame, a carrier movable with respect thereto, a plurality of presses on said carrier each having a fluid operated pressure applying device associated therewith, means for intermittently moving said carrier, means for supplying fluid under pressure to each of said devices including an operating part projecting from said carrier toward said frame, operator controlled actuating means on said frame successively registerable with said operating parts and projectable to engage and work the matter, and means preventing the operator from projecting said actuating means into the path of one of said operating parts during carrier movement.

40. In a machine for pressing shoe work, the combination comprising, a frame, a rotor mounted thereon, a plurality of presses carried by said rotor and each having a fluid operated pressure applying device associated therewith, a source of fluid pressure, conduits between each device and said source, a valve in each conduit movable to pressure applying position where it connects its associated device with said source and to exhaust position where it exhausts fluid from said device, an operating station at one portion of said frame and an exhaust station in advance of said operating station, operating means for each valve movably mounted on said rotor, means at said exhaust station for moving an adjacent valve operating means to shift its associated valve to exhaust position, valve shifting mechanism at said operating station movable by the operator to engage an adjacent valve operating means and move it from the exhaust position to which said means at the exhaust station has moved it so as to shift its associated valve to pressure applying position, and means for preventing the operator from so moving said mechanism until the valve operating means of the press approaching said operating station has been carried by the rotor to a point opposite said mechanism.

41. In a machine for pressing shoe work, the combination comprising a stationary frame, a rotor mounted therein and carrying a plurality of presses, mutually engageable movable press controlling parts on said frame and on said rotor, a reversible electric motor for driving said rotor, means preventing said parts from improperly interfering with each other when the rotor is turned in its proper operating direction, and means for stopping said motor if it turns said rotor in the reverse direction.

42. In a machine for pressing shoe work, the combination comprising a stationary frame, a rotor mounted therein and carrying a plurality of presses, mutually engageable movable press controlling parts on said frame and on said rotor, a reversible electric motor for driving said rotor, a motor cut-out switch, and means for actuating said switch only when the motor turns said rotor in a direction causing improper approach between said frame and rotor parts.

JOHN FREDERICK SMITH.